(12) United States Patent
Al-Qasim

(10) Patent No.: US 12,371,979 B1
(45) Date of Patent: Jul. 29, 2025

(54) SYSTEM AND METHOD FOR GENERATING HYDROGEN AND ENHANCING WELLBORE INJECTIVITY AND HYDROCARBON RECOVERY

(71) Applicant: SAUDI ARABIAN OIL COMPANY, Dhahran (SA)

(72) Inventor: Abdulaziz S. Al-Qasim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/425,863

(22) Filed: Jan. 29, 2024

(51) Int. Cl.
   *E21B 43/16* (2006.01)
   *C09K 8/594* (2006.01)
   *E21B 49/00* (2006.01)

(52) U.S. Cl.
   CPC .............. *E21B 43/16* (2013.01); *C09K 8/594* (2013.01); *E21B 49/00* (2013.01)

(58) Field of Classification Search
   CPC ...... E21B 43/16; E21B 43/162; E21B 43/166; E21B 43/168; C09K 8/58; C09K 8/592; C09K 8/594
   See application file for complete search history.

(56) References Cited

U.S. PATENT DOCUMENTS

| | | |
|---|---|---|
| 3,993,132 A | 11/1976 | Cram et al. |
| 4,557,329 A | 12/1985 | Savard et al. |
| 4,867,238 A | 9/1989 | Bayless et al. |

(Continued)

FOREIGN PATENT DOCUMENTS

| | | |
|---|---|---|
| CN | 112196505 A | 1/2021 |
| CN | 115306364 A | 11/2022 |

(Continued)

OTHER PUBLICATIONS

Okere et al., Review on clean hydrogen generation from petroleum reservoirs: Fundamentals, mechanisms, and field applications, Dec. 15, 2023, International Journal of Hydrogen Energy, vol. 48, Issue 97, pp. 38188-38222 (Year: 2023).*

(Continued)

*Primary Examiner* — Angela M DiTrani Leff
(74) *Attorney, Agent, or Firm* — Osha Bergman Watanabe & Burton LLP

(57) ABSTRACT

A system for generating hydrogen and enhancing wellbore injectivity and hydrocarbon recovery includes at least one wellbore having hydrocarbons, an injector for injecting an enriched aqueous fluid into the wellbore, a fluid sensor located at a target zone of the wellbore, an ignition source located at the target zone, and a hydrogen-permeable membrane located at the target zone. A method for generating hydrogen and enhancing wellbore injectivity and hydrocarbon recovery includes dissolving oxygen into an aqueous fluid to produce an enriched aqueous fluid, injecting the enriched aqueous fluid into a wellbore comprising hydrocarbons, and measuring the concentration of oxygen of the enriched aqueous fluid. The method further includes introducing a catalyst to the target zone, adjusting a concentration of the catalyst of the enriched aqueous fluid, igniting oxygen in the enriched aqueous fluid at the target zone, and separating the produced hydrogen from the gas mixture.

16 Claims, 11 Drawing Sheets

(56) References Cited

U.S. PATENT DOCUMENTS

| | | | |
|---|---|---|---|
| 10,851,629 B2 | 12/2020 | Dwarakanath et al. | |
| 2006/0191686 A1 | 8/2006 | Blauch et al. | |
| 2010/0285315 A1* | 11/2010 | Horiguchi | D01D 5/096 428/401 |
| 2013/0098607 A1* | 4/2013 | Kerr | E21B 43/16 166/256 |
| 2014/0054032 A1* | 2/2014 | Affholter | E21B 43/247 166/272.6 |
| 2020/0182019 A1 | 6/2020 | Wang et al. | |
| 2024/0401449 A1* | 12/2024 | Al-Qasim | C01B 3/48 |

FOREIGN PATENT DOCUMENTS

| | | | | |
|---|---|---|---|---|
| DE | 102022203221 B3 * | 7/2023 | | E21B 43/166 |
| EA | 040344 B1 * | 5/2022 | | |
| KR | 20110016809 A | 2/2011 | | |
| WO | WO-2019224326 A1 * | 11/2019 | | C01B 3/26 |
| WO | 2022015207 A1 | 1/2022 | | |

OTHER PUBLICATIONS

Translation of EA 040344 B1 (Year: 2022).*
Translation of DE-102022203221-B3 (Year: 2023).*
Y. Li et al., "Supercritical Water Oxidation for Environmentally Friendly Treatment of Organic Wastes," Advanced Supercritical Fluids Technologies, IntechOpen, Ch. 6, Oct. 12, 2019 (27 pages).
M.B. Garcia-Jarana et al., "Supercritical water oxidation of nitrogen compounds with multi-injection of oxygen," The Journal of Supercritical Fluids, No. 80, pp. 23-29, Apr. 6, 2013 (7 pages).
H. Jia et al., "Enhanced oil recovery mechanism of low oxygen air injection in high water cut reservoir," J Petrol Explor Prod Technol, No. 8, pp. 917-923, Oct. 3, 2017 (7 pages).
"Why would oxygen be stored as a super critical fluid?" Space Exploration. Accessed Jan. 26, 2024 (4 pages).
M.K. Taj, "Supercritical water oxidation (Scwo) technology," Journal of Biodiversity and Environmental Sciences, vol. 14, No. 5, pp. 53-70, May 2019 (19 pages).
P. Song et al., "Simulation of hydrogen generation via in-situ combusion gasification of heavy oil," International Journal of Hydrogen Energy, vol. 49, pp. 925-936, Jan. 1, 2024 (12 pages).
International Search Report issued in corresponding International Application No. PCT/US2025/012655; mailed May 6, 2025 (5 pages).
Written Opinion of the International Searching Authority issued in corresponding International Application No. PCT/US2025/012655; dated May 6, 2025 (6 pages).

* cited by examiner

SYSTEM AND METHOD FOR GENERATING HYDROGEN AND ENHANCING WELLBORE INJECTIVITY AND HYDROCARBON RECOVERY

BACKGROUND

Enhanced oil recovery (EOR) refers to operations and techniques for extracting oil and gas that cannot be extracted in primary and secondary recovery operations which mainly rely on the pressure difference between the surface and oil/gas reservoir. One of the available EOR techniques is a thermal recovery method of in-situ combustion or "fireflood" in which a volume of air and/or other suitable gas mixture with oxygen is continuously injected into a wellbore and ignited to generate a frame front in the reservoir at the sand face of an injection well. Due to the presence of water (which may be vapor) and hydrocarbons in the wellbore, the ignition of oxygen causes hydrocarbons to combust and generate steam, which may further react with oxygen and hydrocarbons to produce gases including carbon dioxide, carbon monoxide and hydrogen. The generated steam and gases cause the internal pressure of the wellbore and reservoir to increase. The wellbore may be kept pressurized in order for the steam and gases to soak into the subterranean formation. The generated heat from the combustion may contribute to the viscosity reduction of reservoir fluids, such as hydrocarbons.

In case of a single-well configuration, due to the increased reservoir pressure and reduced reservoir fluid viscosity, the reservoir fluids flow into the injection wellbore upon depressurization, which is then collected, and the process may be repeated. Such exemplary EOR technique is known as "huff and puff" method. The combined fireflood and huff and puff method may enhance oil recovery by reducing the viscosity of reservoir fluid and increasing reservoir pressure.

In case of a multiple-wellbore configuration, the increased pressure drives the reservoir fluids across the formation into the production wellbore to be collected.

Direct injection of oxygen/air into a wellbore requires compression and injection equipment made with appropriate materials, such as stainless steel, nickel-based alloy, titanium, tantalum, noble-metal ceramics, which may increase the capital and operational costs. Furthermore, the direct oxygen/air injection process may negatively impact the surfaces of pipelines and integrity of the wellbore casings, which may lead to complications during the fireflood operation. In addition, generated gases including hydrogen would not provide any values unless properly separated and captured. Accordingly, there exists a need for further development of EOR and hydrogen generation and recovery techniques.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for generating hydrogen and enhancing wellbore injectivity and hydrocarbon recovery. The system includes at least one wellbore including hydrocarbons, an injector for injecting an enriched aqueous fluid into the at least one wellbore, a fluid sensor located at a target zone of the at least one wellbore, and an ignition source located at the target zone and a hydrogen-permeable membrane located at the target zone. The fluid sensor is configured to measure the concentration of oxygen in the injected enriched aqueous fluid. The ignition source is configured to ignite oxygen in the enriched aqueous fluid to react oxygen and water in the enriched aqueous fluid and the hydrocarbons present in the at least one wellbore to produce a gas mixture comprising hydrogen. The hydrogen-permeable membrane is configured to separate the produced hydrogen from the gas mixture.

In another aspect, embodiments disclosed herein related to a method for generating hydrogen and enhancing wellbore injectivity and hydrocarbon recovery. The method includes dissolving oxygen into an aqueous fluid to produce an enriched aqueous fluid, injecting the enriched aqueous fluid into at least one wellbore including hydrocarbons, and measuring the concentration of oxygen of the enriched aqueous fluid at a target zone. The method further includes introducing a catalyst to the target zone and adjusting a concentration of the catalyst of the enriched aqueous fluid at the target zone, igniting oxygen in the enriched aqueous fluid at the target zone to react oxygen and water in the enriched aqueous fluid and the hydrocarbons present in the wellbore to produce a gas mixture including hydrogen in a presence of the catalyst, and separating the produced hydrogen from the gas mixture.

Other aspects and advantages of the claimed subject matter will be apparent from the following description and the appended claims.

DETAILED DESCRIPTION

Figure 1:
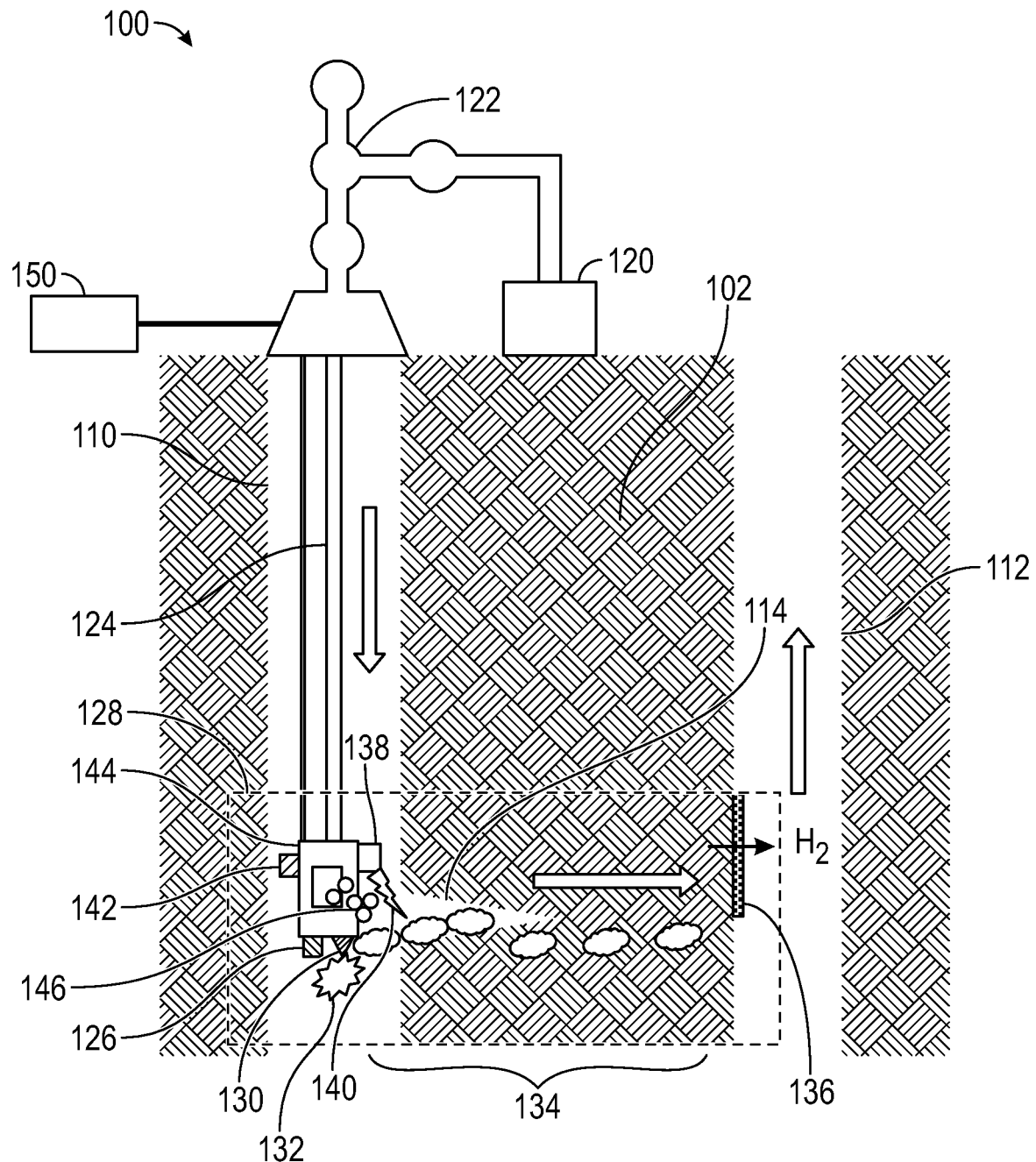
FIG. 1 is a schematic diagram of a system for generating hydrogen and enhancing wellbore injectivity and hydrocarbon recovery according to one or more embodiments.

In one aspect, embodiments disclosed herein relates to a system for generating hydrogen and enhancing wellbore injectivity and hydrocarbon recovery. In one or more embodiments, the system includes at least one wellbore including hydrocarbons, an injector for injecting an enriched aqueous fluid into the at least one wellbore, a fluid sensor located at a target zone of the at least one wellbore and configured to measure a concentration of oxygen in the injected enriched aqueous fluid, an ignition source located at the target zone of the at least one wellbore and configured to ignite oxygen in the enriched aqueous fluid to react oxygen and water in the enriched aqueous fluid and the hydrocarbons present in the at least one wellbore to produce a gas mixture including hydrogen, and a hydrogen-permeable membrane located at the target zone of the at least one wellbore.

In the present disclosure, an "enriched aqueous fluid" refers to an aqueous fluid, such as water, which includes dissolved oxygen. The source of the dissolved oxygen may be pure oxygen gas, a mixture gas of oxygen and other gases, such as air, or a compound capable of producing oxygen, such as peroxides including hydrogen peroxide.

In one or more embodiments, the enriched aqueous fluid has an oxygen concentration in a range of from about 0.001 mg to about 13 mg of oxygen per 1 g of the aqueous fluid. In one or more embodiments, the enriched aqueous fluid has an oxygen concentration in a range of from a lower limit selected from any one of 0.001, 0.002, 0.004, 0.008, 0.01, 0.02, 0.04, 0.041, 0.05, 0.1, 0.5 and 1 mg of oxygen per 1 g of aqueous fluid, to an upper limit selected from any one of 2, 4, 6, 8, 10, 12 and 13 mg of oxygen per 1 g of aqueous fluid, where any lower limit may be paired with any upper limit. However, the oxygen concentration in the enriched aqueous fluid is not limited to the above range, and may vary depending on the operating condition and properties of the aqueous fluid. Appropriate oxygen concentration range may be obtained from experimental data.

The enriched aqueous fluid may be a high-pressure enriched aqueous fluid having an oxygen concentration in a range of more than about 0.008 mg to about 13 mg of oxygen per 1 g of aqueous fluid, or a lightly enriched aqueous fluid having an oxygen concentration in a range of about 0.001 to about 0.041 mg of oxygen per 1 g of aqueous fluid. The oxygen concentration in the high-pressure enriched aqueous fluid may be in a range from a lower limit of more than 0.008 mg oxygen, more than 0.01 mg oxygen, more than 0.02 mg oxygen, more than 0.03 mg oxygen, more than 0.04 mg oxygen, or more than 0.041 mg oxygen, per 1 g of aqueous fluid, to an upper limit selected from any one of 2, 4, 6, 8, 10 12, and 13 mg of oxygen per 1 g of aqueous fluid, where the lower limit may be paired with any of the upper limit. The oxygen concentration in the lightly enriched aqueous fluid may be in a range from a lower limit selected from any one of 0.001, 0.002 and 0.004 mg of oxygen per 1 g of water, to an upper limit of 0.008, 0.01, 0.02, 0.04, and 0.041 mg of oxygen per 1 g of aqueous fluid, where any lower limit may be paired with the upper limit.

The oxygen concentration in the enriched aqueous fluid may be determined based on theoretical calculations, simulations and experimental data. The oxygen concentration of the enriched aqueous fluid may be adjusted such that the enriched aqueous fluid provides sufficient amount of oxygen to effectively react the oxygen, water and hydrocarbon to produce the gas mixture including hydrogen, but not to the extent which results in complete combustion of the hydrocarbons or generation of undesired byproducts. The high-pressure enriched aqueous fluid may be used in the target zone located at a shallower portion of the wellbore, while the lightly enriched aqueous fluid may be used in the target zone located at a deeper portion of the wellbore. The shallower portions of the wellbore are subjected to less overburden pressure, and therefore, a higher-pressure fluid can be more effective in these regions. On the other hand, the lightly enriched aqueous fluid may typically be used in the target zone located at a deeper portion of the wellbore. The deeper portions of the wellbore are subjected to higher overburden pressures, and a lightly enriched fluid can be more suitable under these conditions.

In the present disclosure, a "target zone" of the at least wellbore refers to a portion of the wellbore where the ignition of oxygen is conducted. The target zone of the wellbore may be a portion of the wellbore or the entirety of the wellbore. In one or more embodiments, the target zone may include a portion of the wellbore where the enriched aqueous fluid is introduced within the injection wellbore. For example, the target zone may be a region of the wellbore in which enhanced oil recovery is actively taking place, and enhanced oil recovery fluids are being employed.

FIG. 1 is a schematic diagram of the system for generating hydrogen and enhancing wellbore injectivity and hydrocarbon recovery according to one or more embodiments. The system 100 includes at least one wellbore including an injection wellbore 110 and a production wellbore 112, in a subterranean formation 102. The subterranean formation 102 may include a fracture 114. An enriched aqueous fluid is injected into the injection wellbore 110 with an injector 120. The enriched aqueous fluid may be introduced into a target zone 128 of the injection wellbore 110 through a Christmas tree 122 and tubing 124. The oxygen concentration of the enriched aqueous fluid is measured with a fluid sensor 126 located in the target zone 128 of the injection wellbore 110. Ignition 132 of oxygen in the enriched aqueous fluid is conducted by an ignition source 130 located in the target zone 128. The ignition of oxygen causes oxygen to react with water and hydrocarbons present in the injection wellbore 110 to produce a gas mixture 134 and heat. The reaction may produce a combustion front which may move through the reservoir. The generation of heat raises the temperature, and under the elevated temperature condition, such as 350° C. or more, reaction between oxygen, hydrocarbons and water causes hydrocarbon and water molecules to degrade, producing a gas mixture 134 including hydrogen and carbon oxides. The gas mixture 134 flows through the subterranean formation 102 as a result of the pressure gradient generated by the injected water, and drives the formed gas mixture 134 toward the production wellbore 112. Reservoir fluid also flows through the subterranean formation 102 to the production wellbore 112. A hydrogen-permeable membrane 136 located at a target zone 128 of the production wellbore 112 separates hydrogen gas from the gas mixture 134 and reservoir liquid. Separated hydrogen gas is then retrieved from the at least one wellbore, such as the production wellbore 112. The gas mixture 134 without hydrogen and any liquid that flow into the production wellbore 112 are also retrieved.

The system 100 may further include a stimulus generator 138 for generating a stimulus 140. The system 100 may also include a wellbore-monitoring sensor 142 for monitoring the injectivity of the injection wellbore 110, and the reactivity of oxygen, water and the hydrocarbons in the injection wellbore 110. The system 100 may include a catalyst container 144 located at the target zone 128 of the injection wellbore 110 and configured to release a catalyst 146 into the injection wellbore 110.

The ignition source 130, and catalyst container 144 and the fluid sensor 126 may be connected to a controller 150 such that the ignition source 130 and catalyst container 144 can communicate with the fluid sensor 126. The stimulus generator 138 and the wellbore-monitoring sensor 142 may also be connected to the controller 150.

In one or more embodiments, the system includes at least one wellbore comprising hydrocarbons. The at least one wellbore may be wellbores used in the oil and gas industry. The wellbore may be an injection well 110, a production well 112, or combinations thereof. The wellbore may be vertical, horizontal or combinations thereof, and may be located onshore or offshore.

In one or more embodiments, the system 100 includes an injector 120 for injecting an enriched aqueous fluid into the at least one wellbore. The injector 120 may be an injector for injecting fluid into a wellbore used in the oil and gas industry. The injector 120 may be capable of injecting a fluid at a substantially high pressure, such as at or above the critical pressure of water, which is approximately 22 MPa. The injector 120 may be an apparatus known in the art, such as a coiled tubing, capillary tubing and fluid compression system, or an apparatus specifically designed for the present disclosure by taking various factors into consideration, such as air compression, ignition requirement, well design, and production requirements. The enriched aqueous fluid may be introduced to the at least one wellbore through a Christmas tree 122, and tubing 124.

In one or more embodiments, the system 100 includes a fluid sensor 126 located at the target zone 128 of the at least one wellbore. The fluid sensor 126 may be configured to measure the concentration of oxygen in the injected enriched aqueous fluid, and communicate with the ignition source 130.

The fluid sensor 126 may be a chemical analysis sensor which determines the oxygen concentration in the fluid via chemical analysis such as a titration method, an electrochemical analysis sensor which determines the oxygen concentration in the fluid via electrochemical analysis such as diaphragm electrode method, a photochemical analysis sensor which determines the oxygen concentration in the fluid via photochemical analysis such as fluorescence method, or combinations thereof. In one or more embodiments, the fluid sensor 126 includes all of the chemical analysis sensor, the electrochemical analysis sensor, and the photochemical analysis sensor. The fluid sensor 126 may be capable of operating under a substantially high temperature and high pressure, such as at or above the critical point of water which occurs at a temperature of approximately 374° C. and a pressure of approximately 22 MPa. The fluid sensor 126 may be produced in accordance with High-Pressure-High-Temperature (HPHT) Design Guidelines issued by American Petroleum Institute (API). The Guidelines may be applicable for pressures greater than 15,000 psia (15 ksi, 103. 43 MPa) and temperatures greater than 350° F. (177° C.).

The fluid sensor 126 may be any sensors available in the art, provided that the sensor is designed to withstand the operating temperature and pressure. An example of the chemical analysis sensor may include, but is not limited to, Yokogawa ISC40 which uses conductivity measurement to determine the concentration of substance within a solution. Examples of the electrochemical analysis sensor may include, but are not limited to, a sensor including an yttria-stabilized zirconia bulk ceramic electrolyte, which may be capable of measuring oxygen concentration in an oxygen hydrogen mixture as low as 0.5%, and Oxigraf's sensor, which uses laser diode-absorption technology to measure the oxygen concentration in a sample. Examples of the photochemical analysis sensor may include, but are not limited to, OxyOne oxygen analyzer/inerting system which uses zirconia and electrochemical technology, and Oxigraf's sensor. The photochemical analysis sensor works by measuring the light intensity changes which occur due to the chemical reactions within the fluid.

The fluid sensor 126 may be configured to communicate with the ignition source 130 such that the ignition source may be activated and deactivated based on the oxygen concentration of the enriched aqueous fluid measured by the fluid sensor 126. The ignition source 130 may be configured to be activated when the fluid sensor 126 detects an oxygen concentration equal to or above the Limiting Oxygen Concentration (LOC) level or Minimum Oxygen Concentration (MOC) level under the condition at which the ignition is being conducted. The LOC and MOC levels vary with pressure, temperature and the amount of inert gas present with oxygen. The fluid sensor 126 and the ignition source 130 may directly communicate, or may indirectly communicate through another device such as a controller 150. The fluid sensor 126 and the ignition source 130 may communicate by any communication methods available in the art, and may communicate electronically or mechanically. An electronic communication may include wireless communication or wired communication.

In one or more embodiments, the system 100 includes an ignition source 130 located at the target zone 128 of the at least one wellbore. The ignition source 130 ignites oxygen included in the enriched aqueous fluid, which causes a reaction between oxygen and water included in the enriched aqueous fluid and hydrocarbons present in the at least one wellbore to produce a gas mixture 134 including hydrogen. The ignition source 130 may be a device or apparatus capable of igniting oxygen included in the enriched aqueous fluid. In one or more embodiments, the ignition source 130 is operated electrically, mechanically, chemically, or a combinations thereof, and includes a downhole spark system, a gas-fired downhole burner, a catalytic heater, and an electric downhole heater. The ignition source 130 may be capable of operating under a substantially high temperature and high pressure, such as at or above the critical point of water. The ignition source 130 may be operated manually or automatically, and may be controlled based on the measured oxygen concentration of the enriched aqueous fluid, as previously described.

In one or more embodiments, the system 100 includes a hydrogen-permeable membrane ("membrane") 136 located at the target zone 128 of the at least one wellbore. The membrane 136 may be designed to be selectively-permeable to hydrogen. The membrane 136 allows the separation of hydrogen included in the gas mixture produced as a result of the reaction of oxygen and water in the enriched aqueous fluid and hydrocarbons present in the wellbore. The separation process of hydrogen may be influenced by various factors such as temperature, pressure and properties of the gas mixture.

In one or more embodiments, the membrane 136 located at the target zone 128 may allow hydrogen to migrate into the wellbore to be retrieved while the gas mixture 134 without hydrogen and the liquid may remain in the formation. The gas mixture 134 without hydrogen and the liquid in the formation may flow into the wellbore and be retrieved upon removal of the membrane 136.

The hydrogen-permeable membrane 136 may be a membrane available in the art which is capable of separating hydrogen from a gas mixture. In one or more embodiments, the membrane includes a metallic membrane, a ceramic membrane, a polymer membrane or a composite membrane. The metallic membrane may be produced from metals such as stainless steel, copper (Cu), palladium (Pd), vanadium (V), tantalum (Ta), niobium (Nb), combinations thereof, and alloys including any of the above-mentioned metals.

In one or more embodiments, the system 100 includes a stimulus generator 138 for introducing a stimulus 140 to the target zone 128 in the wellbore. A stimulus 140 may be an energy form which includes, but is not limited to, an acoustic wave, an ultrasonic wave, an infrasonic wave, electromagnetic waves (ratio waves, microwaves, infrared waves, visible light, ultraviolet light, x-rays and gamma rays), and combinations thereof. The stimulus 140 may also include seismic waves including primary waves, pressure waves, shear waves, surface waves, and combinations thereof. Seismic waves refer to waves of energy caused by breaking of rock within the formation or an explosion Pressure waves refer to waves generated by an pressure oscillation in solid, liquid or gas. Shear waves (S-waves) refer to waves that oscillate perpendicular to the direction of a wave propagation. Surface waves refer to waves that travel along the surface or interface between two different media, such as the ground surface, or interface between water and air. Primary waves (P-waves) refer to seismic waves that arrive at a seismic station first. The stimulus generator 138 may include an acoustic wave generator, an ultrasonic wave generator, an infrasonic wave generator, an electromagnetic wave generator, which may include a ratio wave generator, a microwave generator, an infrared generator, a visible light generator, an ultraviolet light generator, an x-ray generator, a gamma ray generator, and combinations thereof. The stimulus generator 138 may be located in the wellbore, or above the surface, provided that the stimulus generator can deliver the stimulus 140 to the target zone 128 of the wellbore.

In one or more embodiments, the system 100 includes a wellbore-monitoring sensor 142 for monitoring the injectivity of the at least one wellbore and the reactivity of oxygen, water and the hydrocarbons in the at least one wellbore. An injectivity of a wellbore refers to a measure of wellbore fluid uptake. Wellbore injectivity may be measured by injecting a liquid such as water or gas such as carbon dioxide and determining the amount of the fluid injected under a specific pressure and duration. The wellbore-monitoring sensor 142 may be located in the target zone 128 of the at least one wellbore, or outside of the target zone 128. The wellbore-monitoring sensor 142 may include one sensor or a plurality of sensors. The wellbore-monitoring sensor 142 may be an in-situ fluid analyzer, which is a real-time down hole fluid analysis (DFA) system including various sensors that are integrated. The in-situ analyzer may be capable of obtaining quantitative fluid properties and delivering characteristics of reservoir fluid and reservoir conditions.

In one or more embodiments, the system 100 includes a catalyst container 144 located at the target zone 128 of the at least one wellbore. The catalyst container 144 may include a shell portion, a cavity portion in which a catalyst 146 is placed, and a catalyst releaser configured to release the catalyst 146 from the cavity portion into the wellbore. The catalyst releaser may be configured based on the design known in the art. The catalyst releaser may include a mobile part, such as a window which can be opened and closed as desired to release the catalyst contained in the catalyst container. The catalyst releaser may include a dispensing mechanism, such as a piping/tubing and a valve to release the catalyst as desired actively using an apparatus such as a pump, or passively with the gravitational force The catalyst container may be retrieved to refill with the catalyst during the operation, or may be connected to a tube or a pipe such that the catalyst may be delivered to the catalyst container at will without retrieving during the operation.

The catalyst container 144 may be produced from a variety of materials, provided that the catalyst container 144 can withstand the operating temperature and pressure. In one or more embodiments, the catalyst container 144 is produced from metals such as stainless steel, copper (Cu), palladium (Pd), vanadium (V), tantalum (Ta), niobium (Nb), combinations thereof, and alloys including any of the above-mentioned metals.

The catalyst container 144 may include sensors to measure various parameters such as temperature, pressure of the surrounding fluid and chemical composition of the components included in the surrounding fluid. The sensors may be capable of identifying the structures of the surface intermediates produced during the reaction of oxygen, water and hydrocarbon with the presence of the catalyst.

The catalyst container 144 may be configured to communicate with the fluid sensor 126 such that the release of the catalyst 146 from the catalyst container 144 into the wellbore may be controlled based on the oxygen concentration of the enriched aqueous fluid measured by the fluid sensor 126. The oxygen concentration at which the release of the catalyst 146 is triggered may vary based on various factors such as the type of catalyst, temperature and pressure, and such oxygen concentration may be determined experimentally.

The fluid sensor 126 and the catalyst container 144 may directly communicate, or may indirectly communicate through another device such as a controller. The fluid sensor 126 and the catalyst container 144 may communicate by any communication methods available in the art, and may communicate electronically or mechanically. An electronic communication may include wireless communication or wired communication.

In one or more embodiments, the system includes one wellbore or a plurality of wellbores. The wellbore may be a vertical wellbore, horizontal wellbore, or combinations thereof.

FIGS. 2-6 are schematic diagrams of the system for generating hydrogen and enhancing wellbore injectivity and hydrocarbon recovery according to one or more embodiments.

Figure 2A:
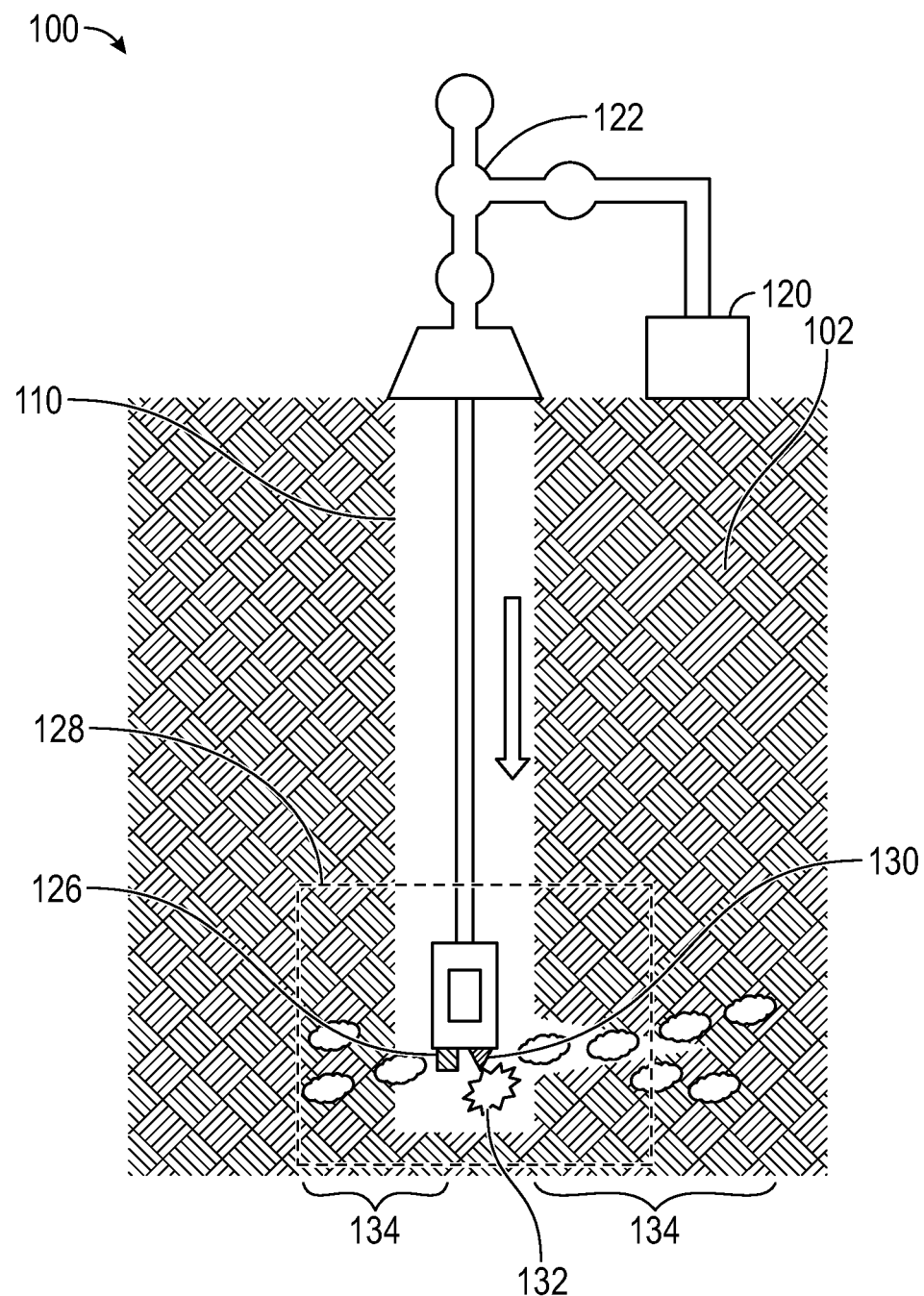
FIGS. 2A and 2B are schematic diagrams of a system for generating hydrogen and enhancing wellbore injectivity and hydrocarbon recovery according to one or more embodiments.
Figure 2B:
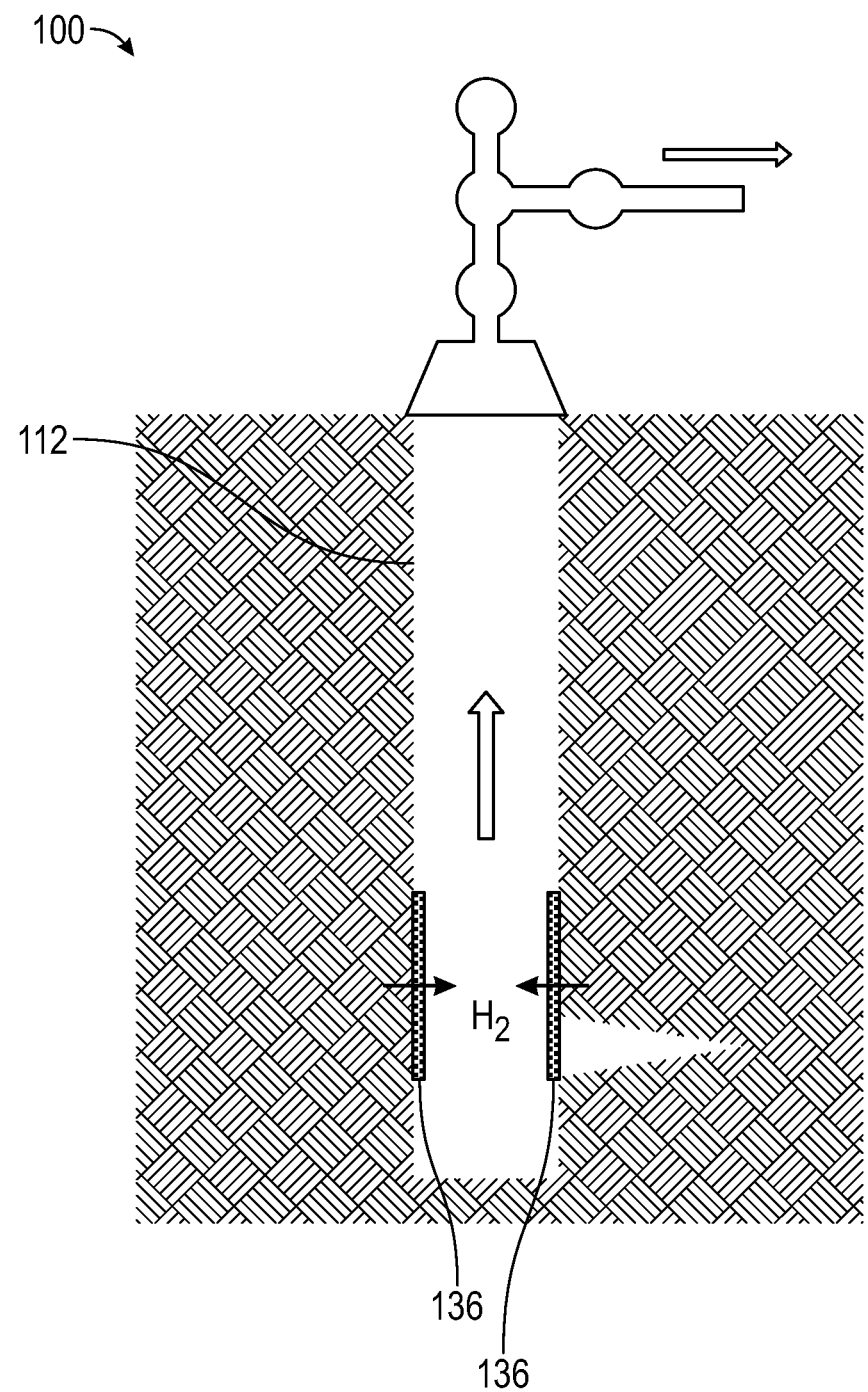
Figure 3A:
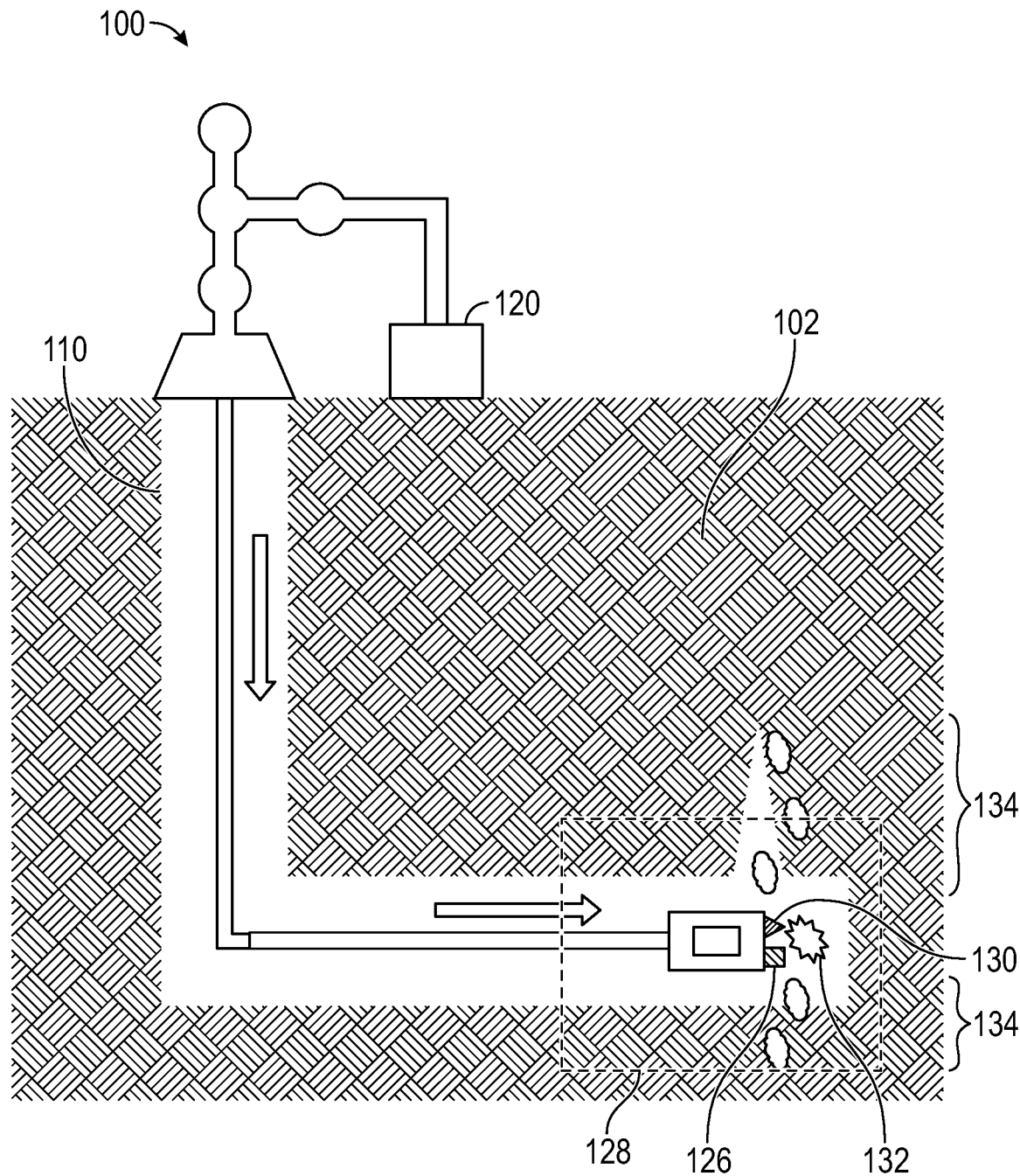
FIGS. 3A and 3B are schematic diagrams of a system for generating hydrogen and enhancing wellbore injectivity and hydrocarbon recovery according to one or more embodiments.
Figure 3B:
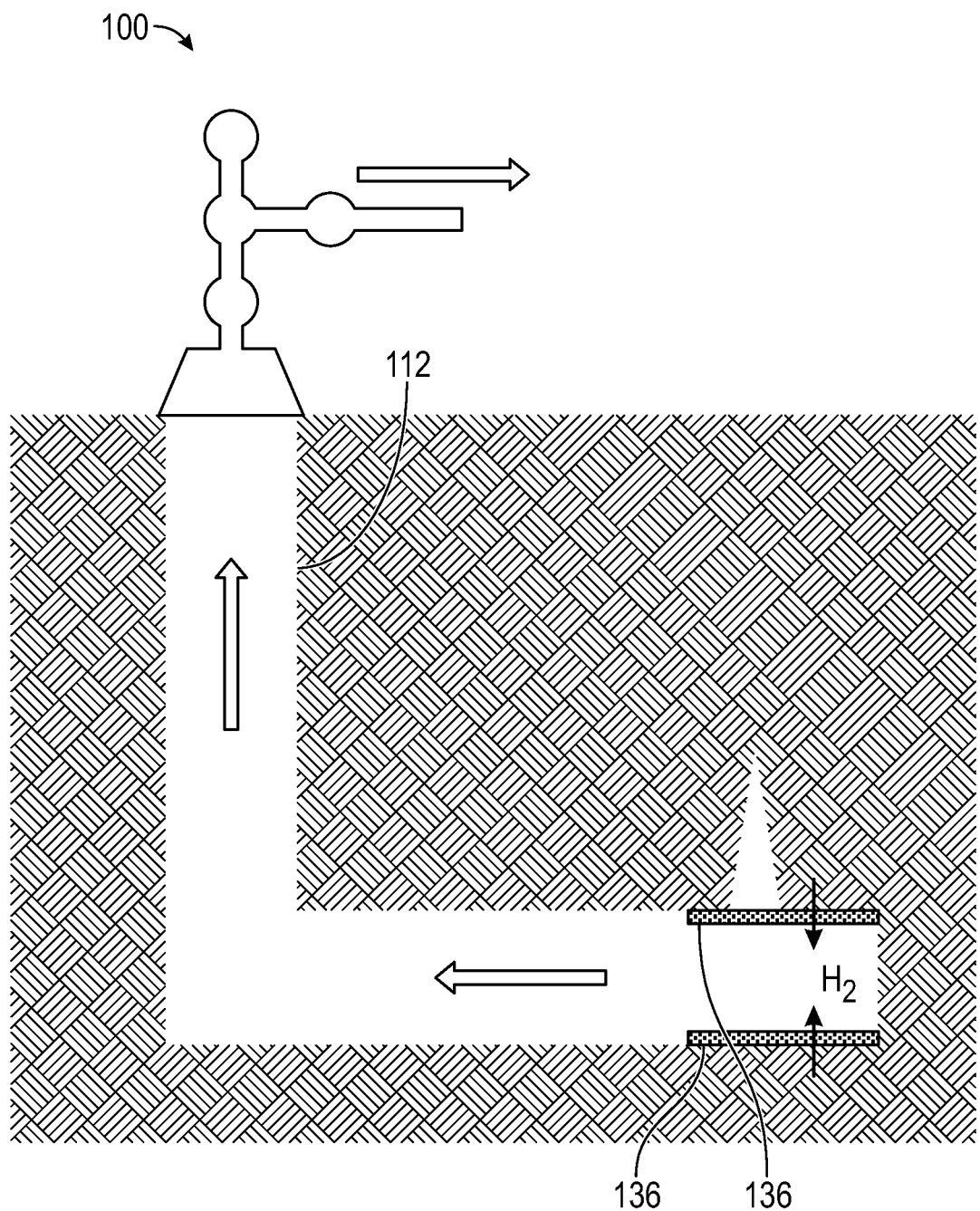
Figure 4A:
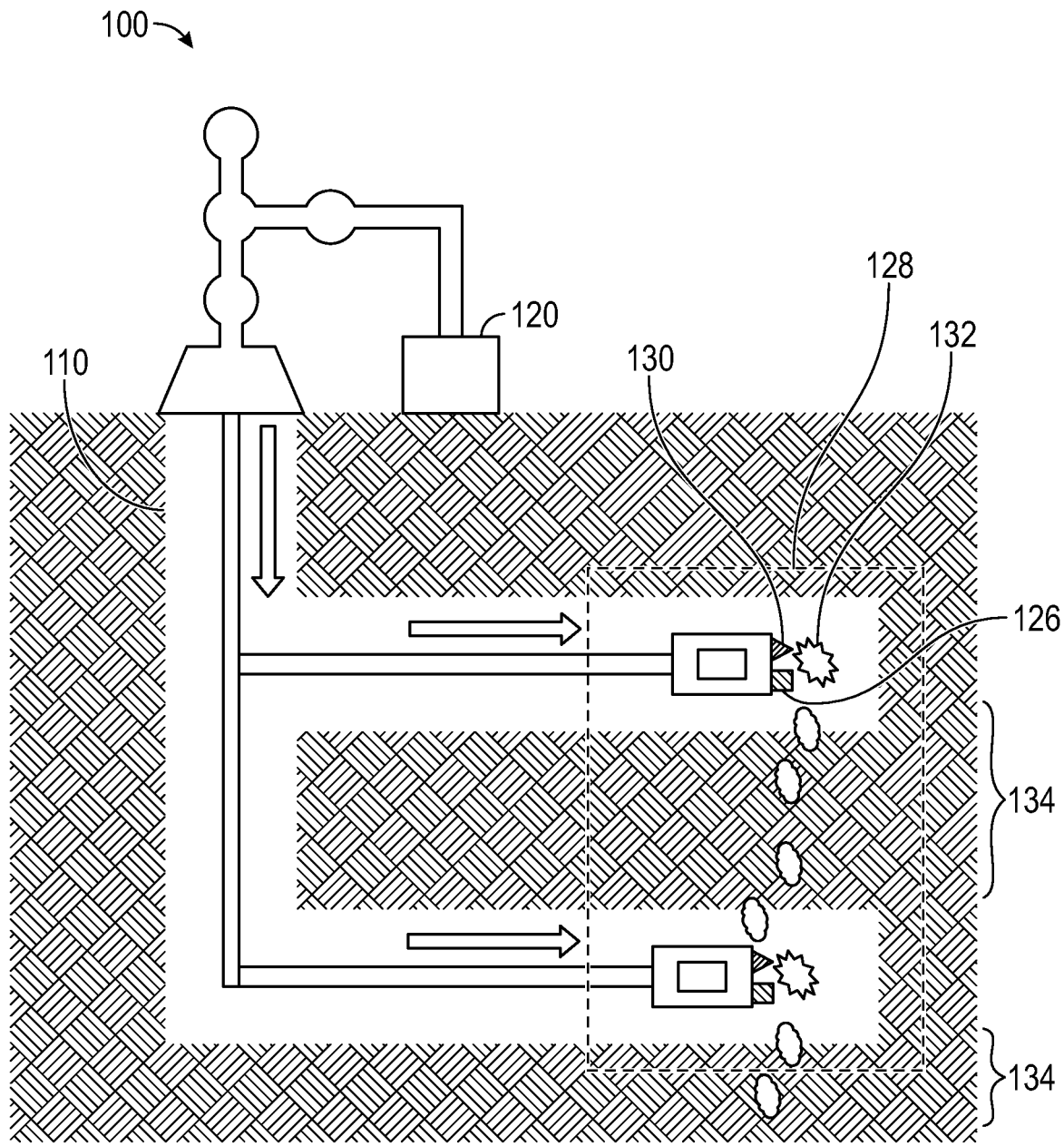
FIGS. 4A and 4B are schematic diagrams of a system for generating hydrogen and enhancing wellbore injectivity and hydrocarbon recovery according to one or more embodiments.
Figure 4B:
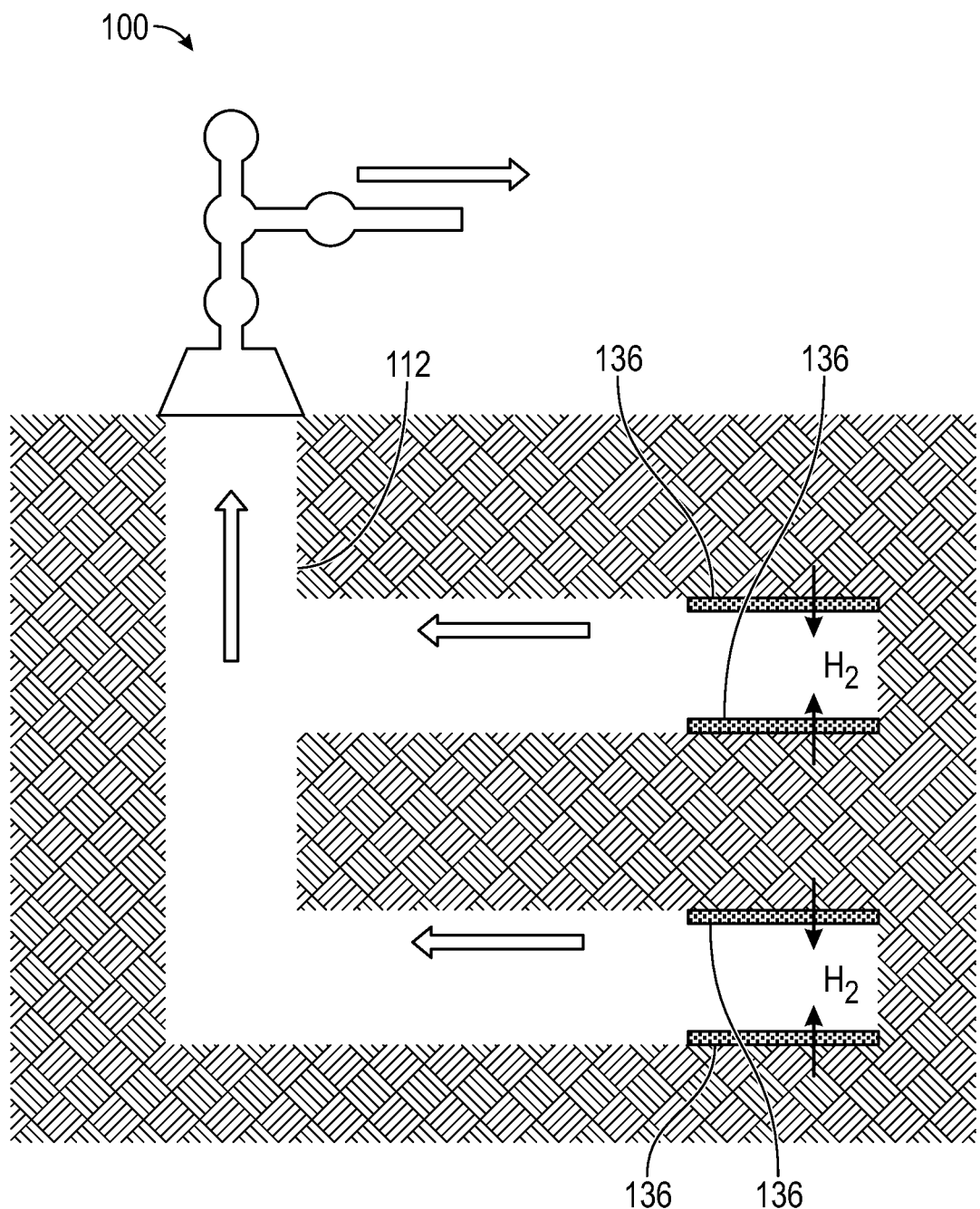

FIGS. 2A, 3A, and 4A show the system 100 including a wellbore which is an injection wellbore 110 located in a subterranean formation 102. FIG. 2A shows an injection wellbore 110 that is a vertical wellbore and FIG. 3A shows an injection wellbore 110 that is a horizontal wellbore. FIG. 4A shows an injection wellbore 110 having a multilateral wellbore configuration, and each of the lateral wellbore includes a fluid sensor 126, and an ignition source 130. As previously described, an enriched aqueous fluid is injected into the injection wellbore 110 with an injector 120 and introduced to a target zone 128. The oxygen concentration of the enriched aqueous fluid is measured with a fluid sensor 126 located in the target zone 128 of the injection wellbore 110. Ignition 132 of oxygen in the enriched aqueous fluid is conducted by an ignition source 130 located in the target zone 128. The ignition 132 of oxygen causes oxygen to react with water and hydrocarbons present in the injection wellbore 110 to produce a gas mixture 134 and heat. The gas mixture 134 flows into the subterranean formation 102 as a result of the pressure gradient generated by the injected water and formed gas mixture 134. The pressure within the injection wellbore 110 is maintained for a predetermined time duration to generate a desired amount of hydrogen and obtain a desired wellbore injectivity. The pressure in the wellbore 110 is then reduced which causes the gas mixture 134 along with reservoir fluid to flow out toward the injection wellbore 110, which becomes a production wellbore 112 (FIG. 2B shows a vertical production wellbore, FIG. 3B shows a horizontal production wellbore, and FIG. 4B shows a production wellbore with multilateral wellbore configuration). As shown in FIGS. 2B, 3B and 4B, a hydrogen-permeable membrane 136, located at a target zone 128 of the production wellbore 112 separates hydrogen gas from the gas mixture 134 and reservoir fluid that is flowing toward the production wellbore 112. Each of the lateral wellbore in FIG. 4B contains a hydrogen-permeable membrane 136. Separated hydrogen gas is then retrieved from the production wellbore 112. The gas mixture 134 without hydrogen and any liquid that flow into the production wellbore 112 are also retrieved.

Figure 5:
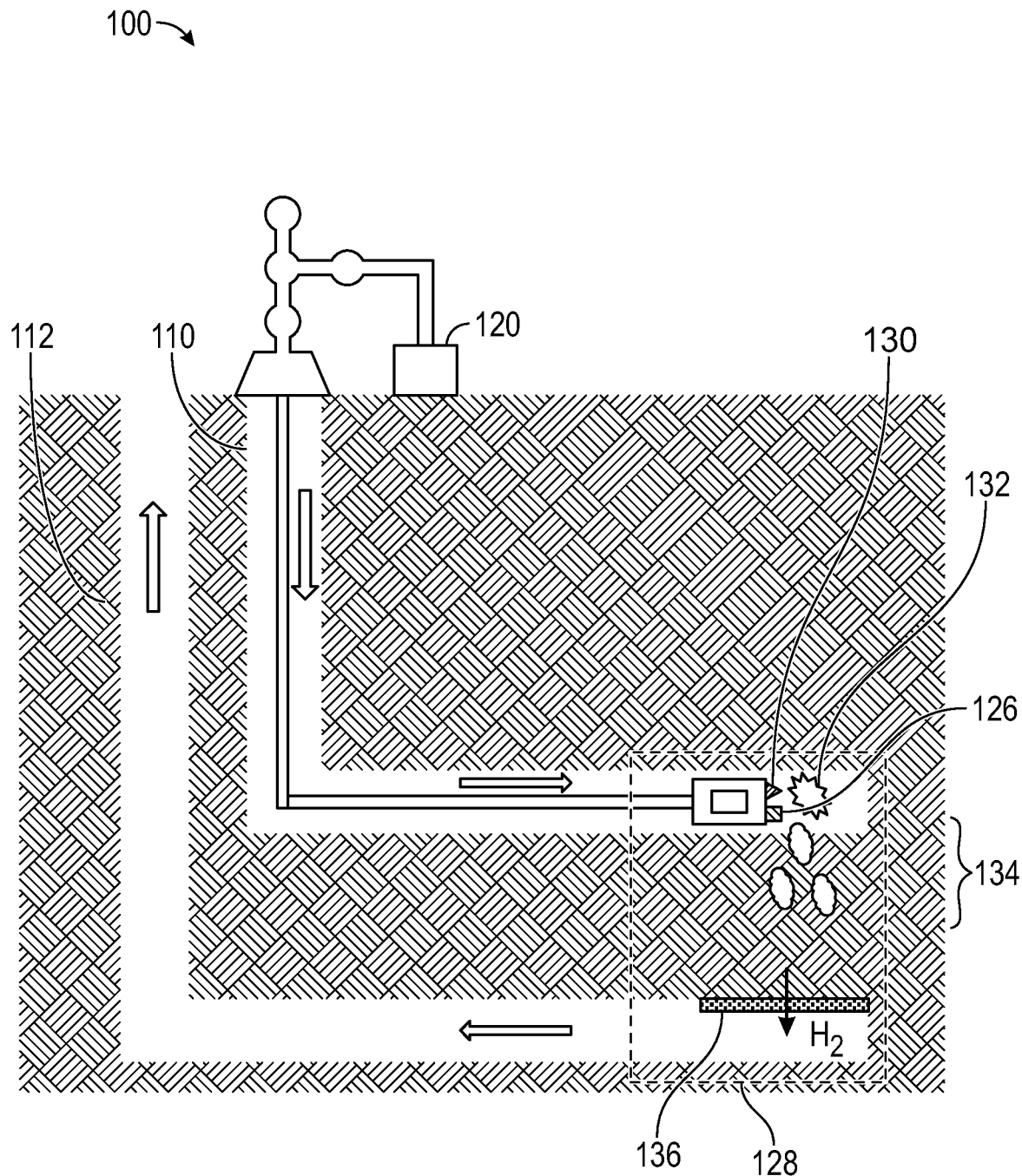
FIG. 5 is a schematic diagram of a system for generating hydrogen and enhancing wellbore injectivity and hydrocarbon recovery according to one or more embodiments.
Figure 6:
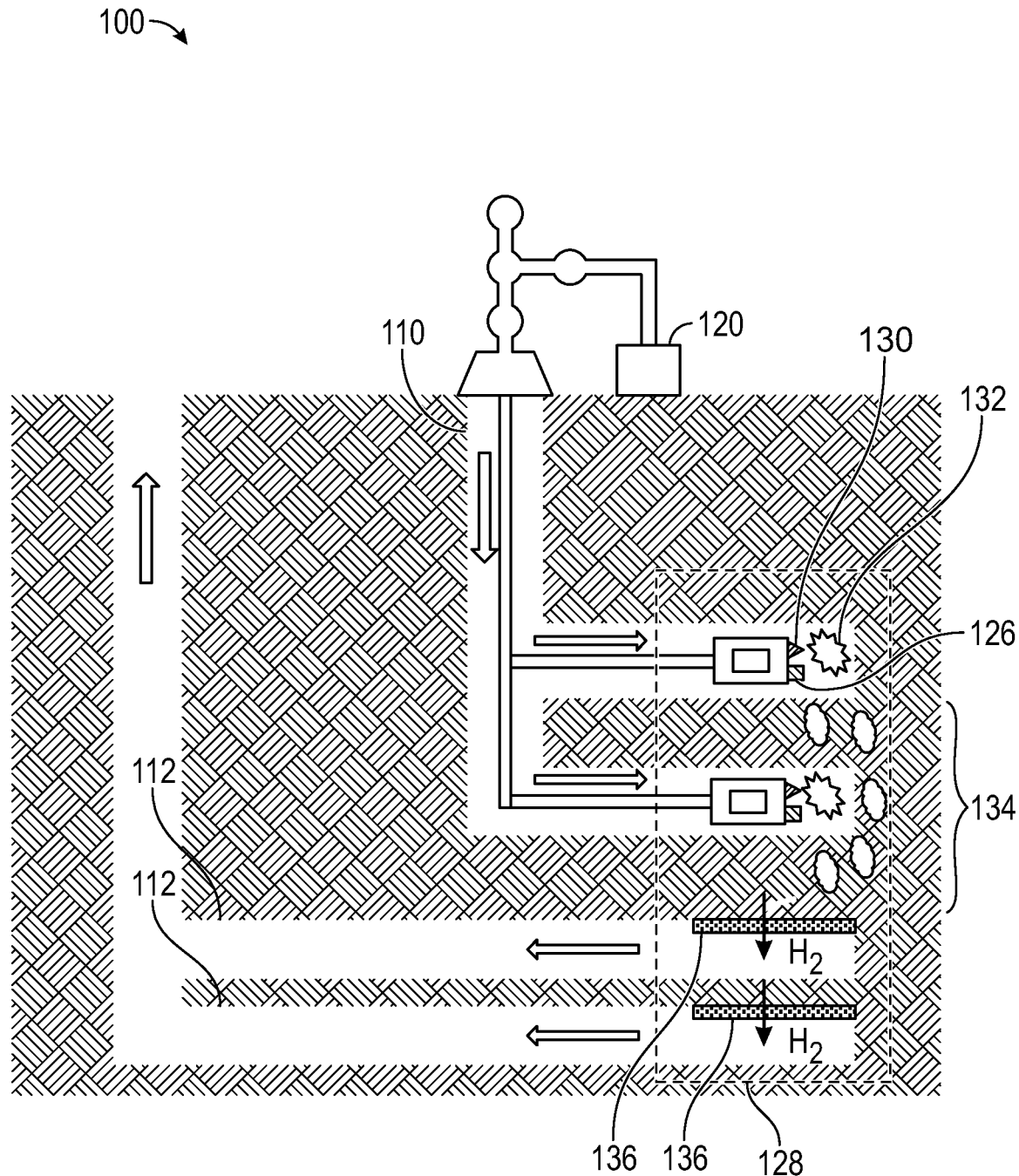
FIG. 6 is a schematic diagram of a system for generating hydrogen and enhancing wellbore injectivity and hydrocarbon recovery according to one or more embodiments.

The system 100 of FIG. 5 shows a configuration with one horizontal injection wellbore 110 and one horizontal production wellbore 112. The system 100 of FIG. 6 shows a configuration with one injection wellbore 110 having a multilateral wellbore configuration, and a plurality of production wellbores 112. As previously described, an enriched aqueous fluid is injected into the injection wellbore 110 with an injector 120 and introduced to a target zone 128. Each of the lateral wellbore contains a fluid sensor 126 and an ignition source 130. The oxygen concentration of the enriched aqueous fluid is measured with the fluid sensor 126. Ignition 132 of oxygen in the enriched aqueous fluid is conducted by the ignition source 130 to produce a gas mixture 134 and heat. Similar to the system 100 of FIG. 1., the gas mixture 134 flows through the subterranean formation 102 toward the production wellbore 112. A hydrogen-permeable membrane 136, located at a target zone 128 of the production wellbore 112 separates hydrogen gas from the gas mixture 134 and reservoir fluid. As shown in FIG. 6, in case there are a plurality of production wellbores, 112, each of the production wellbore 112 includes a hydrogen-permeable membrane 136. Separated hydrogen gas is then retrieved from the production wellbore 112. The gas mixture 134 without hydrogen and any liquid that flow into the production wellbore 112 are also retrieved.

Method for Generating Hydrogen and Enhancing Wellbore Injectivity and Hydrocarbon Recovery In one aspect, embodiments disclosed herein relates to a method for generating hydrogen and enhancing wellbore injectivity and hydrocarbon recovery. The method includes dissolving oxygen into an aqueous fluid to produce an enriched aqueous fluid, injecting the enriched aqueous fluid into at least one wellbore comprising hydrocarbons, measuring a concentration of oxygen of the injected enriched aqueous fluid at a target zone of the at least one wellbore, introducing a catalyst to the target zone of the at least one wellbore and adjusting adjust a concentration of the catalyst of the enriched aqueous fluid at the target zone to a range of from about 0.1 to about 10 wt %, igniting oxygen in the enriched aqueous fluid at the target zone to react oxygen and water in the enriched aqueous fluid and the hydrocarbons present in the at least one wellbore to produce a gas mixture comprising hydrogen in a presence of the catalyst, and separating the produced hydrogen from the gas mixture.

Figure 7:
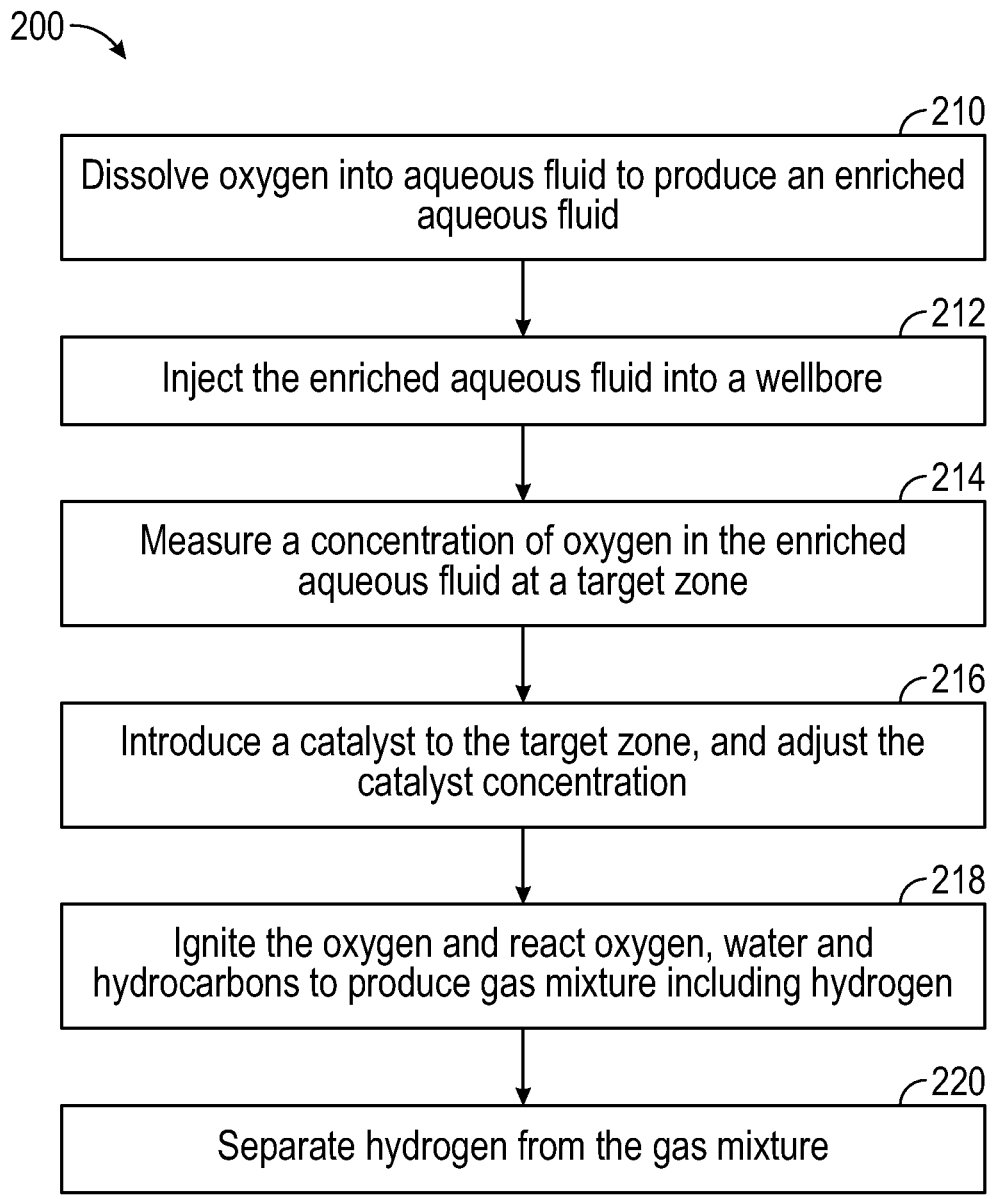
FIG. 7 is a flow diagram of a method for generating hydrogen and enhancing wellbore injectivity and hydrocarbon recovery according to one or more embodiments.

FIG. 7 is a flow diagram for the method in accordance with one or more embodiments. The method for generating hydrogen and enhancing wellbore injectivity and hydrocarbon recovery 200 includes dissolving oxygen into aqueous fluid to produce an enriched aqueous fluid (step 210). The enriched aqueous fluid including oxygen is injected into at least one wellbore including hydrocarbons (step 212). The enriched aqueous fluid flows into the wellbore and into a target zone of the wellbore. In step 214, the concentration of oxygen in the enriched aqueous fluid at the target zone is measured. A catalyst is then introduced to the target zone of the wellbore, and the catalyst concentration in the enriched aqueous fluid is adjusted (Step 216). The adjusting of the catalyst concentration may be controlled based on the measured concentration of oxygen obtained in step 214. In step 218, oxygen in the enriched aqueous at the target zone is ignited to react oxygen and water in the enriched aqueous fluid and hydrocarbons present in the wellbore to produce a gas mixture including hydrogen. In step 220, hydrogen in the gas mixture is separated from other components in the gas mixture.

Figure 8:
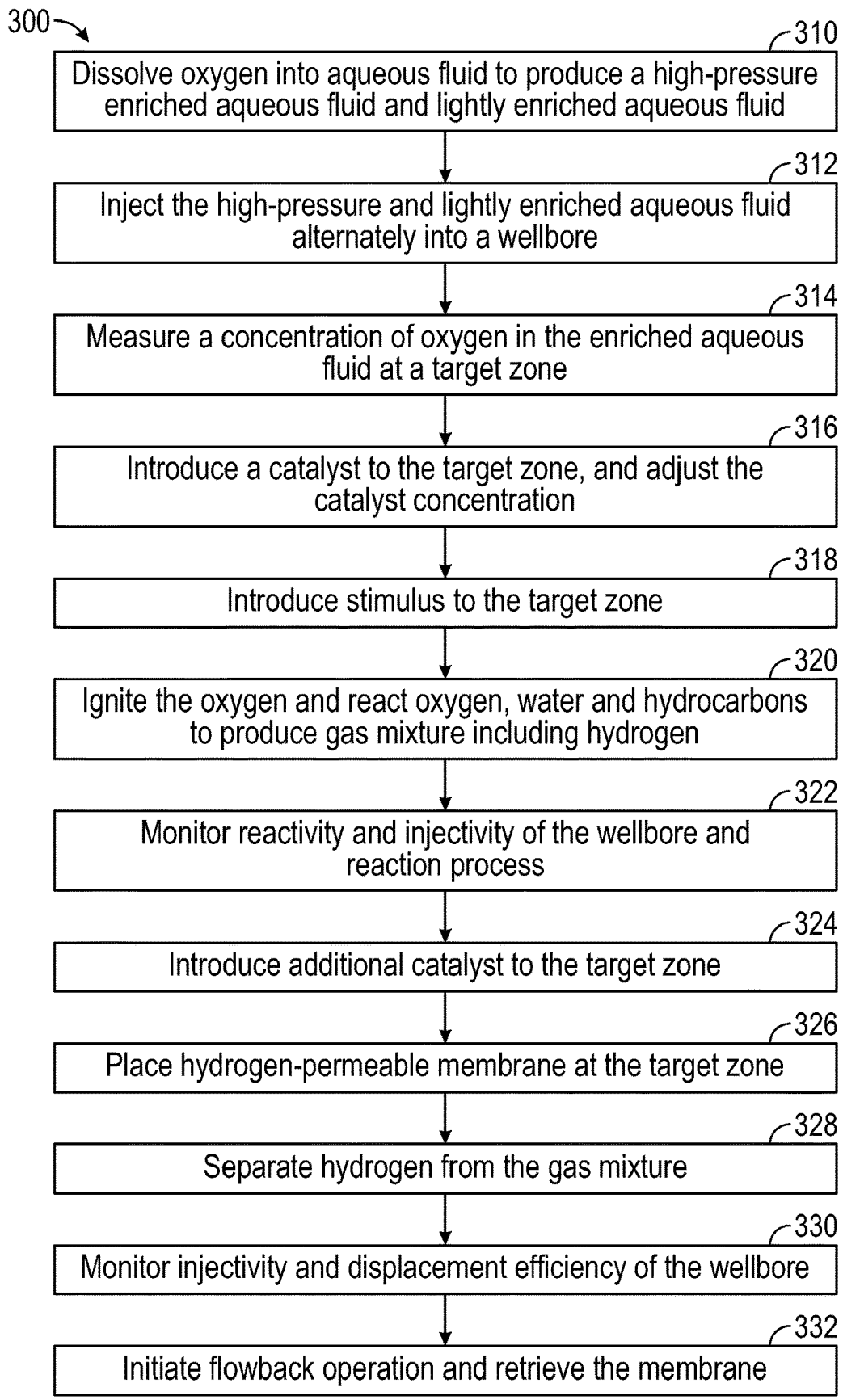
FIG. 8 is a flow diagram of a method for generating hydrogen and enhancing wellbore injectivity and hydrocarbon recovery according to one or more embodiments.

FIG. 8 is a flow diagram for the method in accordance with one or more embodiments. The method for generating hydrogen and enhancing wellbore injectivity and hydrocarbon recovery 300 includes dissolving oxygen into aqueous fluid to produce a high-pressure enriched aqueous fluid and lightly enriched aqueous fluid (step 310). The amount of oxygen in each of the high-pressure enriched aqueous fluid and lightly enriched aqueous fluid is described in the previous section. In step 312, the high-pressure enriched aqueous fluid and lightly enriched aqueous fluid are alternately injected into at least one wellbore which flow through the wellbore and into a target zone of the wellbore. In step 314, the concentration of oxygen in the enriched aqueous fluid at the target zone is measured. A catalyst is then introduced to the target zone of the wellbore, and the catalyst concentration in the enriched aqueous fluid is adjusted (step 316). The adjusting of the catalyst concentration may be controlled based on the measured concentration of oxygen obtained in step 314. A stimulus is then introduced to the target zone of the wellbore in step 318. In step 320, oxygen in the enriched aqueous at the target zone is ignited to react oxygen and water in the enriched aqueous fluid and hydrocarbons present in the wellbore to produce a gas mixture including hydrogen. The injectivity of the wellbore, and the reactivity of oxygen, water and hydrocarbons are monitored in step 322. An additional catalyst may be introduced to the target zone in step 324. In step 326, a hydrogen-permeable membrane is placed at the target zone of the wellbore, and in 328 hydrogen in the gas mixture is separated from other components in the gas mixture with the hydrogen-permeable membrane.

In one or more embodiments, the method for generating hydrogen and enhancing wellbore injectivity and hydrocarbon recovery includes dissolving oxygen into an aqueous fluid to produce an enriched aqueous fluid (step 210, 310). The dissolving of oxygen into aqueous fluid, such as water, may be conducted by a method known in the art. In one or more embodiments, the dissolving of oxygen is conducted by processes such as a super oxygenation process, electrolysis process, cascading process, by using an air stone/bubbler apparatus, and combinations thereof. A super oxygenation process includes the use of at least two oxygenators arranged in series or parallel. In the electrolysis process, an electrolysis cell is used to separate water into hydrogen and oxygen and then dissolve oxygen into water. In the cascading process, an aqueous fluid is introduced to a reservoir of the fluid in a matter to generate agitation such that the aqueous fluid is aerated/oxygenated by the air or oxygen through the agitation. The air stone/bubbler apparatus generates small bubbles of air or oxygen in the fluid where the apparatus is placed, and the oxygen dissolves into the fluid. In one or more embodiments, The dissolving of oxygen into an aqueous fluid is conducted by producing a stabilized hydrogen peroxide solution and then adding an appropriate amount of the solution into an aqueous fluid.

The source of the oxygen used in the dissolving process of oxygen may be pure oxygen gas, or a gaseous mixture including oxygen, such as air. The source of oxygen may also be an oxygen-producing compound, such as hydrogen peroxide. The enriched aqueous fluid may be produced prior to being injected into the wellbore and stored under appropriate conditions such that the dissolved oxygen level is maintained, or may be produced immediately prior to being injected into the wellbore.

Dissolution of oxygen into the aqueous fluid is influenced by factors such as temperature, pressure, salinity and turbulence of the fluid. Increase in the aqueous fluid temperature or salinity may reduce the amount of dissolved oxygen in the fluid under a given pressure. Increase in pressure and fluid turbulence may increase the amount of oxygen dissolved in the aqueous fluid.

In one or more embodiments, the method includes injecting the enriched aqueous fluid into at least one wellbore (step 212, 312). The injection of the enriched aqueous fluid may include injection of the high-pressure enriched aqueous fluid, the lightly enriched aqueous fluid, or combinations thereof. In embodiments in which the high-pressure enriched aqueous fluid and the lightly enriched aqueous fluid are both injected, the high-pressure enriched aqueous fluid and the lightly enriched aqueous fluid may be injected alternately. The alternate injection of the high-pressure and lightly enriched aqueous fluid may be conducted once, or may be repeated multiple times.

In one or more embodiments, the alternate injection may be initiated with the injection of the high-pressure enriched aqueous fluid first, followed by the lightly enriched aqueous, and then the cycle may be repeated. The alternate injection conducted in such a manner may provide increased initial hydrocarbon displacement and improved injectivity of the reservoir.

In one or more embodiments, the alternate injection may be initiated with the injection of the lightly enriched aqueous first, followed by the high-pressure enriched aqueous fluid, and then the cycle may be repeated. The alternate injection conducted in such a manner may be conducted in order to pre-condition the reservoir and/or conserve the high-pressure enriched aqueous fluid.

In the alternate injection step of high-pressure and lightly enriched aqueous fluid, the injection of each of the high-pressure and lightly enriched aqueous fluid may have a duration of, but are not limited to about 1 minute to about 100 hours. The injection may be conducted at a pressure in a range of, but are not limited to, from about 1 to about 30 MPa gage. The specific order of the alternate injection method, the duration and the pressure of each injection step may depend on, and be determined based on, the specific objectives of the operation and the characteristics of the reservoir, and the duration and the pressure may be outside of the above-mentioned ranges. In one or more embodiments, the injection pressure is adjusted such that the pressure at the target zone of the wellbore is at or above the critical pressure of water.

In one or more embodiments, the method includes measuring a concentration of oxygen in the enriched aqueous fluid at the target zone (step 214, 314). The measuring may be conducted by a fluid sensor located in the target zone of the wellbore.

The measuring of the oxygen concentration may be conducted chemically such as a titration method, electrochemically such as diaphragm electrode method, photochemically such as fluorescence method, or combinations thereof. In one or more embodiments, the measuring of the oxygen includes measuring chemically, electrochemically and photochemically. The measurement may be conducted continuously or intermittently depending on the requirements of each operation.

In one or more embodiments, the method includes introducing a catalyst to the target zone, and adjusting the catalyst concentration in the enriched aqueous fluid at the target zone to a concentration in a range of from about 0.1 to about 10 wt % (step 216, 316).

The catalyst may be introduced to the target zone by injecting the catalyst into the wellbore with a carrier fluid. The catalyst may be introduced by placing the catalyst in a catalyst container and placing the catalyst container in the target zone. The catalyst container may be activated to release the catalyst from the catalyst container into the wellbore fluid.

The adjustment of the catalyst concentration at the target zone may be conducted by controlling the amount of catalyst introduced to the target zone. In case the catalyst container is used to introduce the catalyst, controlling of the amount of catalyst at the target zone may include the fluid sensor communicating with the catalyst container, and releasing the catalyst from the catalyst container based on the measured oxygen concentration by the fluid sensor. The catalyst container may include, for example, a shell portion and a cavity portion where the catalyst is placed, and a catalyst releaser to release the catalyst from the cavity portion into the at least one wellbore The catalyst may be introduced to the target zone continuously or intermittently.

Examples of the catalyst include, but are not limited to, manganese oxide, $CeO_2$—$ZrO_2$, graphene oxide-modified Co—B—P, $C_3N_4$/Co—W—B/Ni composite, which may be a foam, transition metals and transition metal compounds, alkali catalysts, and combinations thereof. The manganese oxide catalyst may be nanoparticles of manganese (II) oxide. $CeO_2$—$ZrO_2$ may be a suitable catalyst because of its high thermal stability, oxygen storage capacity, and improved reducibility, and may enhance the reaction efficiency of hydrogen generation in one or more embodiments. Nanoparticles of manganese oxide may stabilize the reaction process of oxygen, water and hydrocarbons. Alkali catalysts may include sodium hydroxide (NaOH), potassium hydroxide (KOH), sodium methoxide ($NaCH_3O$) and potassium methoxide ($KCH_3O$). High oxygen storage capacity (OSC) of the catalytic material generally ensures high conversion. The favorable environment for fast diffusion of oxygen helps in maintaining a continuous supply of oxygen from bulk to surface and results in an enhanced reducibility and catalytic activity.

In one or more embodiments, the method includes igniting oxygen included in the enriched aqueous fluid at the target zone of at least one wellbore and reacting oxygen and water in the enriched aqueous fluid and hydrocarbons present in the wellbore to produce a gas mixture comprising hydrogen (steps 218, 320). The ignition of oxygen may be conducted using an ignition source as previously described and in the presence of the catalyst. The gas mixture generated in the ignition step creates a pressure gradient and drives the fluid present in the subterranean formation out of the formation, such as into a production well. The heat generated due to the ignition step may reduce the fluid viscosity in the formation, further contributing to the flow and extraction of the fluid in the formation.

In one or more embodiments, the ignition of oxygen and the reaction of oxygen, water and hydrocarbons may be conducted at or above the critical temperature and critical pressure of water, which are approximately 374° C. and approximately 22 MPa. The ignition of oxygen and the reaction oxygen, water and hydrocarbons may be conducted at a temperature in a range of from about 374° C. to about 1200° C., such as in a range of from a lower limit selected from any one of 374, 380, 390, 400 and 450° C., to an upper limit selected from any one of 600, 650, 700, 800, 900, 1000, 1100 and 1200° C., where any lower limit may be paired with any upper limit. The ignition of oxygen and the reaction oxygen, water and hydrocarbons may be conducted at a pressure in a range of from about 22 MPa to about 28 MPa, such as a lower limit selected from any one of 22, 23 and 24 MPa, to an upper limit selected from any one of 26, 27 and 28 MPa, where any lower limit may be paired with any upper limit.

The reaction of oxygen, water and hydrocarbons conducted under the aforementioned conditions may undergo supercritical water oxidation reaction. The reaction conducted under the supercritical condition may provide enhanced and/or efficient combustion process because insoluble or sparingly soluble components in water under the standard conditions (such as 20° C./1 atm pressure) may become soluble in water. Such components may include hydrocarbons and oxygen. Under supercritical conditions, no distinct liquid and gas phases exist, which may substantially alter the fluid properties such as density, viscosity and diffusivity. Such changes in fluid properties may further contribute to the combustion process. The combustion of oxygen, water and hydrocarbons under the supercritical conditions may occur via a gas phase free-radical mechanism. Under supercritical conditions, pathways of the reaction oxygen, water and hydrocarbons may be altered, which may result in improved combustion efficiency and/or production of different combustion products. The concentration of oxygen in the enriched aqueous fluid, injection pressure of the enriched aqueous fluid, and controlling of the ignition steps and catalyst release rate may be controlled to achieve the critical pressure and temperature at the target zone.

Reaction of oxygen, water and hydrocarbons under supercritical conditions may produce hydrogen through a supercritical water gasification (SCWG) process. In SCWG process, hydrocarbons react with water under supercritical conditions, such as above 374° C. and 22.1 MPa to produce hydrogen and other reaction products. The SCWG process may include breaking down hydrocarbons into smaller compounds, and reacting the smaller compounds with water to produce gases including hydrogen and carbon dioxide. Increase in the reaction temperature of water, oxygen and hydrocarbons under SCWG process may increase the conversion ratio of produced hydrogen gas.

The gas mixture produced by reacting oxygen, water and hydrocarbons may include hydrogen, oxygen, carbon dioxide, carbon monoxide, and hydrogen sulfide.

In one or more embodiments, the method includes separating hydrogen from the produced gas mixture. (steps 220, 328). In one or more embodiments, the gas mixture may be extracted to the outside of the wellbore and hydrogen is then separated using method known in the art. In one or more embodiments, hydrogen is separated from the gas mixture in-situ (in the wellbore) by placing a hydrogen-permeable membrane at the target zone of the wellbore.

In one or more embodiments, the separation of hydrogen from the produced gas mixture in-situ may be conducted via an adsorption and desorption process. Such an adsorption process may be conducted by using, for example, a palladium sponge, as an adsorbent placed at the target zone of the wellbore. The adsorption and desorption of hydrogen may be conducted by cyclically increasing and decreasing the pressure of the wellbore, between 1 and 35 bar, for example, such that the hydrogen is adsorbed into the adsorbent under the increased pressure, and desorbed from the adsorbent as the pressure is decreased. Desorbed hydrogen may then be retrieved.

In one or more embodiments, the separation of hydrogen from the produced gas mixture in-situ may be conducted using a polymeric foam placed at the target zone of the wellbore. A gas mixture including hydrogen may be introduced to the polymeric foam which contains non-communicating pores and the hydrogen may be stored in the pore while the other components in the gas mixture may flow out of the foam. The stored hydrogen then may then be retrieved.

In one or more embodiments, the separation of hydrogen from the produced gas mixture may be conducted alone or in combination of any of the methods as described above.

In one or more embodiments, the method includes introducing a stimulus to the target zone of at least one wellbore (step 318). The stimulus may be an energy form as previously described, and may include an acoustic wave, an ultrasonic wave, an infrasonic wave, an electromagnetic wave, and combinations thereof. The stimulus may increase the reaction rate of oxygen, water and hydrocarbons to produce hydrogen, and may increase the flow of fluids within the wellbore and/or reservoir, which may contribute to efficient recovery of generated hydrogen. The stimulus may increase the permeability of the reservoir, which may increase the flow of fluids through the reservoir. The stimulus may also increase the microbial activities within the reservoir, which may generate hydrogen gas.

The stimulus may be introduced to the target zone by a stimulus generator, such as an acoustic wave generator, an ultrasonic wave generator and an infrasonic wave generator that are located in the wellbore, or above the surface. The stimulus may be introduced before, during and/or after the ignition of oxygen. The stimulus may be introduced continuously or intermittently. The introduction of stimulus may be determined based on the reservoir conditions (e.g., temperature, pressure, and fluid composition), and/or based on reservoir simulation studies. In one or more embodiments, the stimulus is introduced when there is a need to increase the reaction rate of hydrogen generation and/or gas flow rate through the wellbore/reservoir. The stimulus may be introduced to enhance well integrity. The strength of the stimulus and duration of stimulus introduction may be determined based on the requirements of each operation, and various factors such as conditions of the wellbore/reservoir, types of hydrocarbons and specific method used for hydrogen generation.

In one or more embodiments, the method includes monitoring the injectivity of the at least one wellbore, and monitoring the reactivity of oxygen, water and hydrocarbons in the at least one wellbore (step 322). The injectivity of the wellbore, and the reactivity of the oxygen, water and hydrocarbons may be monitored with a wellbore-monitoring sensor. The monitoring may be manually or automatically conducted, and may be continuously or intermittently conducted.

In one or more embodiments, the method includes introducing an additional catalyst to the target zone of at least one wellbore (step 324). The introduction method of the additional catalyst may be the same or similar to the introduction of catalyst in steps 216 and 316 as previously described. The additional catalyst may be introduced to the target zone after the reaction of oxygen, water and hydrocarbons takes place. Additional catalyst may be the same catalyst used in the introduction of the catalyst (steps 216 and 316) or different catalysts. The additional catalyst may be introduced continuously or intermittently.

In one or more embodiments, the method includes placing a hydrogen-permeable membrane at a target zone of the at least one wellbore (step 326). The wellbore may be an injection wellbore, a production wellbore or a combination thereof. The membrane, which may be appropriately selected based on the operating temperature and pressure, and desired flow rate, may be placed at the target zone with methods known in the art. In one or more embodiments, the membrane is placed at the target zone by lowering the membrane to the target zone on a wireline or coiled tubing, for example. The membrane may be deployed as a part of a larger assembly. The placement of the membrane may be conducted prior to separating hydrogen from the produced gas mixture (steps 220, 328).

In one or more embodiments, the method includes monitoring the injectivity and displacement efficiency of at least one wellbore (step. 330). A displacement efficiency refers to a ratio of an amount of oil that has been recovered from a specific reservoir after displacement fluid, such as the enriched aqueous fluid, into the wellbore and the reservoir, and a total amount oil in the reservoir. The injectivity and displacement efficiency may be monitored by the wellbore sensor as previously described. The monitored wellbore may be an injection wellbore. The displacement efficiency of the wellbore located in a high water cut reservoir with homogeneous porous medium and subjected to the present method may provide a displacement efficiency in a range of 6 to 12%.

In one or more embodiments, the method includes conducting a flowback operation and retrieving the hydrogen-permeable membrane (step 332). A flowback operation refers to a recovery operation of fluid used for well treatment operations, such as the enriched aqueous fluid used in the present method. Conducting of the flowback operation and retrieval of the membrane are performed such that the oil and gas extraction process from the wellbore may be resumed.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke means-plus-function for any limitations of any of the claims herein, except for those in which the claim expressly uses the words 'means for' together with an associated function.

What is claimed is:

1. A system for generating hydrogen and enhancing wellbore injectivity and hydrocarbon recovery, comprising:
   at least one wellbore comprising hydrocarbons;
   an injector for injecting an enriched aqueous fluid into the at least one wellbore;
   a fluid sensor located at a target zone of the at least one wellbore configured to measure a concentration of oxygen in the injected enriched aqueous fluid;
   an ignition source located at the target zone of the at least one wellbore and configured to ignite oxygen in the enriched aqueous fluid to react oxygen and water in the enriched aqueous fluid and the hydrocarbons present in the at least one wellbore to produce a gas mixture comprising hydrogen; and
   a hydrogen-permeable membrane located at the target zone of the at least one wellbore and configured to separate the produced hydrogen from the gas mixture,
   wherein the fluid sensor comprises a chemical analysis sensor, an electrochemical analysis sensor, and a photochemical analysis sensor.

2. The system of claim 1, wherein the fluid sensor is further configured to:
   communicate with the ignition source, and
   activate and deactivate the ignition source based on the measured concentration of oxygen by the fluid sensor.

3. The system of claim 1, wherein the at least one wellbore comprises an injection wellbore and a production wellbore.

4. The system of claim 1, further comprising a stimulus generator for introducing a stimulus to the target zone in the wellbore,
   wherein the stimulus generator comprises at least one selected from the group consisting of an acoustic wave generator, an ultrasonic wave generator, and an infrasonic wave generator.

5. The system of claim 1, further comprising a wellbore-monitoring sensor for monitoring injectivity of the at least one wellbore and reactivity of oxygen, water and the hydrocarbons in the at least one wellbore.

6. The system of claim 1, further comprising a catalyst container located at the target zone of the at least one wellbore, wherein:
   the catalyst container comprises:
      a shell portion;
      a cavity portion for placing a catalyst; and
      a catalyst releaser configured to release the catalyst from the cavity portion into the at least one wellbore,
   the catalyst container is configured to:
      communicate with the fluid sensor, and
      control a release of the catalyst into the at least one wellbore based on the measured concentration of oxygen by the fluid sensor.

7. A method for generating hydrogen and enhancing wellbore injectivity and hydrocarbon recovery, the method comprising:
   dissolving oxygen into an aqueous fluid to produce an enriched aqueous fluid having a concentration of oxygen in a range of from more than 0.008 mg of oxygen per 1 g of the aqueous fluid to 13 mg of oxygen per 1 g of the aqueous fluid;
   dissolving oxygen into an aqueous fluid to produce a lightly enriched aqueous fluid having an oxygen concentration in a range of from 0.001 mg of oxygen per 1 g of the aqueous fluid to 0.008 mg of oxygen per 1 g of the aqueous fluid;
   injecting the enriched aqueous fluid and the lightly enriched aqueous fluid alternately into at least one wellbore comprising hydrocarbons;
   measuring the concentration of oxygen of the enriched aqueous fluid at a target zone of the at least one wellbore;
   introducing a catalyst to the target zone of the at least one wellbore;
   igniting oxygen in the enriched aqueous fluid at the target zone to react oxygen and water in the enriched aqueous fluid and the hydrocarbons present in the at least one wellbore to produce a gas mixture comprising hydrogen in a presence of the catalyst; and
   separating the produced hydrogen from the gas mixture.

8. The method of claim 7, wherein the measuring the concentration of oxygen is conducted with a fluid sensor comprising at least one selected from the group consisting of a chemical analysis sensor, an electrochemical analysis sensor, and a photochemical analysis sensor.

9. The method of claim 7, further comprising introducing a stimulus to the target zone in the wellbore before the igniting oxygen, wherein the stimulus comprises at least one selected from the group consisting of an acoustic wave, an ultrasonic wave, and an infrasonic wave.

10. The method of claim 7, further comprising monitoring injectivity of the at least one wellbore, and monitoring reactivity of oxygen, water and the hydrocarbons in the at least one wellbore.

11. The method of claim 7, wherein the introducing the catalyst and the adjusting the concentration of the catalyst is conducted based on the measured concentration of oxygen.

12. The method of claim 7, wherein the igniting oxygen is conducted based on the measured concentration of oxygen.

13. The method of claim 7, further comprising placing a hydrogen-permeable membrane at the target zone of the at least one wellbore, wherein the hydrogen-permeable membrane is configured to separate the produced hydrogen from the gas mixture.

14. The method of claim 7, wherein the at least one wellbore comprises an injection wellbore and a production wellbore.

15. The method of claim 7, wherein the injecting the enriched aqueous fluid and the lightly enriched aqueous fluid alternately is conducted for a duration of from 1 minutes to 100 hours each.

16. The method of claim 7, wherein the igniting oxygen and reacting of oxygen, water and hydrocarbons are conducted above a critical temperature and a critical pressure of water.

* * * * *